US006506500B2

(12) United States Patent
Rasp et al.

(10) Patent No.: US 6,506,500 B2
(45) **Date of Patent: *Jan. 14, 2003**

(54) POLYOLEFIN FILM, ITS USE, AND PROCESS FOR ITS PRODUCTION

(75) Inventors: Wolfgang Rasp, Homburg (DE); Detlef Klaus Busch, Saarlouis (DE)

(73) Assignee: Hoechst Trespaphan GmbH, Wiesbaden (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/315,949

(22) Filed: May 21, 1999

(65) Prior Publication Data

US 2002/0006520 A1 Jan. 17, 2002

(30) Foreign Application Priority Data

May 23, 1998 (DE) ........................................ 198 23 162

(51) Int. Cl.[7] ................................................ B32B 27/32

(52) U.S. Cl. ....................... 428/516; 428/323; 428/327; 428/409; 428/910; 156/244.23; 156/244.24; 156/272.6; 264/173.15

(58) Field of Search ................................. 428/515, 516, 428/910, 409, 323, 327; 264/173.15, 290.2; 156/244.23, 244.24, 272.6

(56) References Cited

U.S. PATENT DOCUMENTS

| | | | | |
|---|---|---|---|---|
| 4,419,411 A | | 12/1983 | Park | 428/516 |
| 4,622,237 A | | 11/1986 | Lori | 427/40 |
| 5,264,277 A | * | 11/1993 | Frognet et al. | 428/315.5 |
| 5,272,236 A | | 12/1993 | Lai et al. | 526/348.5 |
| 5,571,613 A | * | 11/1996 | Schuhmann et al. | 428/323 |
| 5,792,549 A | * | 8/1998 | Wilkie | 428/215 |
| 6,287,700 B1 | * | 9/2001 | Kong et al. | 428/447 |

OTHER PUBLICATIONS

Van der Sanden et al. "A new family of linear ethylene polymers provides enhanced sealing performance" Tapi Journal, pp 99–104 Feb. 1992.*

* cited by examiner

*Primary Examiner*—D. Lawrence Tarazano
(74) *Attorney, Agent, or Firm*—Powell Goldstein Frazer & Murphy LLP

(57) ABSTRACT

A biaxially oriented polyolefin film having more than one layer and made from a base layer and from at least one outer layer. The base layer include a fatty amide and the outer layer include at least 80% by weight of a linear olefin polymer. The film is suitable, for example, for producing a film laminate by melt extrusion of a polyethylene layer.

15 Claims, No Drawings

POLYOLEFIN FILM, ITS USE, AND PROCESS FOR ITS PRODUCTION

BACKGROUND OF THE INVENTION

1. Field of the Invention

The invention relates to a polyolefin film having more than one layer and made from a base layer and from at least one outer layer. The invention further relates to the use of the film having more than one layer, and also to a process for its production.

2. Description of the Related Art

For particular applications, the packaging industry requires packaging materials with properties which cannot all be realized within a single film. Different types of film are therefore frequently combined to give a laminate. This lamination requires adhesives or adhesion promoters, which ensure that the laminated films have sufficiently firm adhesion to one another.

In addition, the resultant film laminate has to fulfill certain requirements, in particular, have combinations of properties which firstly are not possessed by individual films and secondly are difficult to achieve even in a laminate made from a variety of components.

Selection of suitable films for producing the laminate, together with finding the right adhesion promoter and cost-effective production pathways, are problems which constantly recur in the technical field of packaging materials.

A cost-effective process for producing laminates of this type is known as extrusion lamination. This process uses extrusion to apply a thin polyethylene layer to a film which has been produced previously in a separate process, and this film to which molten polyethylene has been applied is combined directly with another film. The molten polyethylene layer applied has something of the function of a tie layer between the two laminated films. This is a useful process, since polyethylene is a cost-effective tie layer and the polyethylene layer improves the mechanical properties of the laminate.

German Patent Application P 41 35 096.0 discloses polyolefin films having more than one layer and made from a polypropylene base layer and from an outer layer of an HDPE blend. This HDPE blend is composed of HDPE and co-and/or terpolymers of α-olefins and, if desired, polypropylene. The outer layer of the film having more than one layer has minimal gloss and maximum haze, as a result of which the film takes on a characteristic matt appearance.

A biaxially oriented three-layer polyolefin film, sealable on both sides, is disclosed in U.S. Pat. No. 4,419,411. In these films, an additive combination of polysiloxane and silica has been incorporated into both sealable layers. The base layer consists essentially of polypropylene and comprises a small amount of monocarboxamide, which migrates to some extent from the base layer into the two sealable layers. The polyolefin film described having more than one layer is claimed to have a particularly low coefficient of friction.

SUMMARY OF THE INVENTION

An object of the present invention is to provide a film which is suitable for extrusion lamination and can be printed on both sides and has a low coefficient of friction, where the values of the sliding and static coefficients of friction for one side do not differ substantially from one another. For the lamination, it is important that the film has good adhesion to a polyethylene layer applied by melt extrusion. Another important factor here is that these good adhesion properties should not be impaired by storage or aging of the laminate, i.e., after a certain storage time the bond strength of the laminate should be and preferably must be as good as immediately after its production.

It is also an object of the invention to provide methods of making and using said film.

In accordance with these objectives, there has been provided a biaxially oriented polyolefin film including a base layer comprising a propylene polymer and a fatty amide and an outer layer that comprises at least 80% by weight of a linear olefin polymer.

Further objects, features and advantages of the invention will become apparent from the detailed description that follows.

DETAILED DESCRIPTION OF PREFERRED EMBODIMENTS

The outer layer including the linear olefin polymer is referred to below as outer layer D1. Outer layer D1 of the film having more than one layer comprises at least 80% by weight, preferably from 90 to 100% by weight, in particular from 95 to 98% by weight, of linear polyolefin (linear olefin polymer), based in each case on the weight of the outer layer.

Linear polyolefin which is suitable for the purpose of this invention is disclosed in U.S. Pat. No. 5,272,236, which is hereby incorporated by reference. U.S. Pat. No. 5,272,236 also discloses the process for preparation of such linear polyolefin. Amongst the linear polyolefin disclosed in U.S. Pat. No. 5,272,236 those linear polyolefin are preferred which comprise from 99.5 to 92% by weight of ethylene and from 0.5 to 8% by weight, preferably from 1 to 6% by weight, of octene units (C8). Preferably the octene units of said preferred linear polyolefins are incorporated into the ethylene-chain matrix in such a way that the linear olefin polymer has a particular type of long-chain branching. The preferred linear olefin polymer gives only one GPC peak maximum, the position of which depends on the molecular weight. In contrast, conventional $C_2$–$C_8$ copolymers produced with Ziegler-Natta catalysts exhibit a double peak composed of absorption maxima for LDPE and HDPE.

The linear olefin polymer has particularly long-chain branching. The chain length of the branching is given by the formula

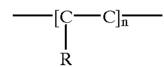

where R>6 carbon atoms for the linear polyolefin, preferably from 8 to 15 carbon atoms.

The $C_2$–$C_8$ copolymers of the prior art have chains with shorter branching, in which the corresponding value would be R=6 carbon atoms.

In dynamic viscometer measurements, the high level of long-chain branching in the linear olefin polymer gives high pseudoplasticity at low shear rates with a marked fall-off at a shear rate of 100 l/s due to the lubricating effect of the high level of long-chain branching with respect to the $C_2$-chain matrix. The crystallization interval, determined by DSC from the heating and cooling curve at a rate of temperature change of 20 K/min, is from 90 to 120° C., preferably from 100 to 110° C.

It has been found that the outer layer of linear polyolefin has excellent adhesion to an extrusion layer of polyethylene.

Surprisingly, the addition of fatty amides to the base layer results in only insignificant impairment of this good adhesion. Adding fatty amides to the base layer therefore permits the coefficient of friction to be reduced in a manner known per se, and does not impair the excellent adhesion of the outer layer to polyethylene during extrusion lamination.

This is all the more surprising, since it has repeatedly been found in a wide variety of experiments with other outer layer materials, that good adhesion to the extrusion layer is only obtained if the film is free from fatty amides which reduce friction. When the linear polyolefin described above is selected as an outer layer, it becomes possible simultaneously to obtain firstly the low coefficient of friction by adding fatty amides and secondly good adhesion of this outer layer to polyethylene during extrusion coating.

In addition, it has been found that the linear polyolefin is also highly suitable for coextrusion with the polypropylene base layer and unexpectedly does not delaminate from the oriented polypropylene base layer during downstream processing. According to the present invention, a polymer has been found for outer layer D1 which on the one hand has the required high adhesion to the polyethylene layer and at the same time has good adhesion to the base layer, i.e., there is the required balance of bond strengths in addition to high strengths in an absolute sense. This balance is an additional important requirement which, in a finished bag pack made from the laminate, ensures that the bag comes apart at the interface intended, specifically in the sealable layer. An outer layer D1 which merely has one side with a high bond strength to the extrusion layer is unsuitable. In a composite of this type, when the bag is opened, outer layer D1 delaminates from the base layer and the composite then continues to come apart in a completely uncontrolled manner.

In a preferred embodiment, outer layer D1 comprises an antiblocking agent, in effective amounts and sizes, generally in amounts of from 0.05 to 1% by weight, preferably from 0.1 to 0.5% by weight, with an average particle size of from 1 to 6 $\mu$m, in particular from 2 to 5 $\mu$m. Any desired antiblocking agent can be used. Suitable antiblocking agents include inorganic additives such as silica, calcium carbonate, magnesium silicate, aluminum silicate, calcium phosphate, and the like and/or incompatible organic polymers such as polyamides, polyesters, polymethyl methacrylate, polycarbonates and the like, preferably silica. Adding antiblocking agents to D1 contributes to easy winding performance of the film during its processing.

The surface D1 should also be preferably subjected to a process for increasing surface tension. For this, preference is given to the flame- or corona-treatments described below in relation to the production process. The increased surface tension improves the printability of the film.

Surprisingly, neither the antiblocking agent nor the surface treatment impairs the good adhesion, significant for the invention, of outer layer D1 to an extrusion layer of polyethylene.

The film according to this invention can be either transparent or opaque. Opaque embodiments comprise in at least one layer either opacifying pigments, preferably $TiO_2$ or voiding agents, like PBT, $CaCO_3$ or the like, which are all well known in the art or a combination of both. Preferably such additives are comprised in the base layer and or in an intermediate layer in effective amounts.

The base layer of the film comprises propylene polymer, generally in amounts of at least 80% by weight, preferably from 90 to 100% by weight, in particular from 95 to 98% by weight, based in each case on the weight of the base layer. Any desired propylene polymer can be used. The propylene polymer generally comprises at least 90% by weight, preferably from 95 to 100% by weight, in particular from 98 to 100% by weight, of propylene, based in each case on the weight of the polymer. Suitable comonomers can be used in amounts of not more than 10% by weight, such as not more than 5% by weight and not more than 2% by weight. Any desired comonomers can be used, including olefins having 2 carbon atoms, or from 4 to 10 carbon atoms, preferably ethylene or butylene.

Suitable base-layer polypropylenes generally have a melting point of 140° C. or above, preferably from 150 to 170° C., and a melt flow index of from 0.5 to 10 g/10 min, preferably from 1.5 to 4 g/10 min, at 230° C. and with a force of 2.16 kg (DIN 53 735). Preference is given to isotactic polypropylene with more than 98% by weight of propylene and with an n-heptane-soluble fraction of not more than 10% by weight, preferably from 1 to 5% by weight, based on the isotactic polypropylene.

According to the invention, it is important that the base layer comprises fatty amides, preferably in amounts of from 0.01 to 0.5% by weight, based on the weight of the base layer. It has been found that with less than 0.01% by weight, the coefficient of friction of the laminate may often be excessively high on the side of outer layer D1. At amounts above 0.5% by weight, the film may often have poor adhesion to the extrusion layer of polyethylene.

Any fatty acid amides can be used. For the purposes of the present invention, fatty amides generally include compounds of the formula

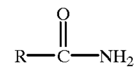

where R is a long-chain aliphatic alkyl radical having from 10 to 20 carbon atoms, preferably having from 12 to 16 carbon atoms. The alkyl radical R is preferably essentially unbranched and essentially saturated. Particularly suitable fatty amides are erucamide and stearamide.

As described above, it is surprising that the fatty amide in the outer layer, into which it is known that it migrates from the base layer, does not have an adverse effect on the adhesion of this outer layer in extrusion lamination.

In a preferred embodiment, the opposite side of the film has another outer layer D2. This outer layer D2 preferably comprises a mixture, described in more detail below, of two components A and B, generally in amounts of at least 80% by weight, preferably from 90 to 100% by weight, in particular from 95 to 100% by weight, based in each case on the weight of outer layer D2, and also, if desired, conventional additives in amounts effective for each.

For the purposes of the present invention, mixtures are mechanical mixtures or blends made from the individual components. Mixtures are prepared from the individual polymers. For this, the individual constituents are generally brought together in the form of pressed moldings of small dimensions, e.g., lenticular or bead-shaped pellets and mixed mechanically using suitable apparatus.

A blend is a composite of the individual components, resembling an alloy, and cannot be separated again into the original constituents. A blend has properties similar to those of a homogeneous material and can therefore be characterized by appropriate parameters. To prepare the blend, the components are mixed with one another in a molten state, and this mixture is then cooled again and pelletized.

Component A of the mixture or of the blend is a propylene homopolymer which comprises at least 98% by weight, preferably 100% by weight, of propylene, based in each case on the weight of the polymer. Preference is given to isotactic propylene homopolymer with an n-heptane-soluble fraction of not more than 10% by weight, preferably from 1 to 5% by weight, based on the isotactic propylene homopolymer. Suitable propylene homopolymers generally have a melting point of 140° C. or above, preferably from 150 to 170° C. and a melt flow index (MFI) of from 3 to 10 g/10 min, preferably from 5 to 8 g/10 min, at 230° C. and with a force of 2.16 kg (DIN 53 735). This MFI should be at least 30% higher, preferably from 40 to 60% higher, than the MFI of the base-layer polypropylene.

Component B of the mixture or of the blend is a propylene copolymer and/or propylene terpolymer, which is composed predominantly of propylene units. Any desired co- or terpolymer can be used. Preference is given to copolymers made from

- propylene and ethylene, or
- propylene and butylene, or
- propylene and another olefin having from 5 to 10 carbon atoms or terpolymers of
- propylene and ethylene and butylene, or
- propylene and ethylene and another olefin having from 5 to 10 carbon atoms or a mixture or a blend of the co- and terpolymers mentioned.

The co- and terpolymers preferably comprise a proportion of more than 50% by weight of propylene, based on the weight of the polymer, and preference is given to

- random propylene-ethylene copolymers with an ethylene content of from 2 to 10% by weight, preferably from 3 to 6% by weight, or
- random propylene-1-butylene copolymers with a butylene content of from 20 to 50% by weight, preferably from 25 to 45% by weight, or
- random ethylene-propylene-butylene terpolymers with an ethylene content of from 1 to 10% by weight, preferably from 2 to 6% by weight, and with a butylene content of from 2 to 20% by weight, preferably from 3 to 10% by weight, or
- a blend made from an ethylene-propylene-butylene terpolymer and a propylene-butylene copolymer with an ethylene content of from 0.1 to 7% by weight and with a 1-butylene content of from 10 to 30% by weight (the remainder being propylene).

The co- and terpolymers described above generally have a melt flow index of from 1.5 to 30 g/10 min, preferably from 3 to 15 g/10 min, and a melting point in the range from 115 to 135° C. The blend described above made from co-and terpolymers has a melt flow index of from 5 to 9 g/10 min, where the melt flow indices given are measured (DIN 53 735) at 230° C. and with a force of 2.16 kg. This MFI of the co- and terpolymers should be at least 30% higher, preferably from 40 to 60% higher, than the MFI of the base-layer polypropylene. To ensure good mixing of the co- and terpolymers with the homopolymer of outer layer D2, the MFIs of components A and B should generally not differ from one another by more than 20%.

The ratio (weight ratio) of the two components A and B of the outer layer mixture and, respectively, of the blend may vary within certain limits, and depends on the intended application for the film having more than one layer. The mixture preferably comprises from 50 to 90% by weight, particularly preferably from 60 to 80% by weight, of component A and from 10 to 50% by weight, particularly preferably from 20 to 40% by weight, of component B.

If the outer layer mixture made from components A and B is used in the form of a blend, then this blend generally has a melt flow index (DIN 53 735 at 230° C. and a load of 2.16 kg) of from 1.5 to 12 g/10 min, preferably from 2.5 to 6 g/10 min, where the melt flow index of the blend is again preferably higher than that of the base-layer propylene polymer. The melting range of the blend lies between 100 and 160° C., preferably between 120 and 150° C.

In a preferred embodiment, outer layer D2 additionally comprises antiblocking agents. If desired, the antiblocking agent used here may be the same as that described for outer layer D1, in comparable amounts. However, the antiblocking agents used are preferably those which, surprisingly, reduce the coefficient of friction still further. Those which have proven particularly successful for this purpose are polymethyl methacrylate (PMMA) particles or alkali-metal/alkaline-earth-metal silicates with an average particle size of from 2 to 6 μm. These preferred antiblocking agents are usually used in amounts of from 0.01 to 0.5% by weight, preferably 0.3% by weight, based on the weight of the outer layer.

If desired, and in addition to the antiblocking agents, outer layer D2 may comprise a lubricant, preferably the fatty amides described above for the base layer, generally in amounts from 0.01 to 0.5% by weight, based on the weight of the outer layer.

Like outer layer D1, D2 may be subjected to a process for increasing surface tension. For this too, preference is given to the flame- or corona-treatments described below in relation to the production process. The increased surface tension extends the improvement in printability to this surface of the film.

The composition of outer layer D2 according to the invention, combined with the composition of the base layer, ensures that the difference between the coefficients of sliding and static friction of outer layer D2 is generally not more than 0.2 unit, preferably not more than 0.1 unit.

The film includes at least the base layer described above and at least outer layer D1, and preferably additionally outer layer D2 on the opposite side. Depending on its intended application, an intermediate layer or layers may be applied between the base layer and the outer layer or layers.

The film can have any desired thickness. The overall thickness of the polyolefin film is generally from 5 to 40 μm, in particular from 10 to 30 μm, where the base layer makes up from about 50 to 90% of the overall thickness of the film. The thickness of outer layer D1 is generally from 0.3 to 2.0 μm. The thickness of outer layer D2 is generally in the range from 0.2 to 2.0 μm.

The density of the film is generally at least 0.8 $g/cm^3$, preferably in the range from 0.9 to 0.92 $g/cm^3$.

For still further improvement in certain properties of the polypropylene film, either the base layer or the outer layer(s) may comprise other additives in effective amounts of each, preferably antistats, stabilizers and/or neutralizing agents which are compatible with the polymers of the base layer and of the outer layer(s). All of the percent by weight (% by weight) quantity data in the description below are based on the particular layer or layers to which the additive may have been added.

Stabilizers which may be used are the usual stabilizing compounds for ethylene polymers, propylene polymers and other olefin polymers. The amounts of these added are from 0.05 to 2% by weight. Particularly suitable stabilizers are phenolic stabilizers, alkali-metal/alkaline-earth-metal stearates and/or alkali-metal/alkaline-earth-metal carbonates. Preferred phenolic stabilizers are used in amounts from 0.1 to 0.6% by weight, in particular from 0.15 to 0.3% by weight, and have a molar mass greater than 500 g/mol.

Pentaerythritol tetrakis[3-(3,5-di-tert-butyl-4-hydroxyphenyl)propionate] or 1,3,5-trimethyl-2,4,6-tris(3,5-di-tert-butyl-4-hydroxybenzyl)benzene are particularly advantageous.

Preferred neutralizing agents are dihydrotalcite (DHT), calcium stearate and/or calcium carbonate of average particle size not greater than 0.7 $\mu$m, of absolute particle size less than 10 $\mu$m and of specific surface area not less than 40 $m^2/g$.

Preferred antistats are alkali-metal alkanesulfonates, polyether-modified, i.e., ethoxylated and/or propoxylated, polydiorganosiloxanes (polydialkylsiloxanes, polyalkylphenylsiloxanes and the like) and/or the essentially straight-chain and saturated aliphatic tertiary amines which have an aliphatic radical having from 10 to 20 carbon atoms and which have ω-hydroxy-($C_1$–$C_4$)-alkyl groups as substituents. N,N-bis(2-hydroxyethyl)alkylamines having from 10 to 20 carbon atoms, preferably from 12 to 18 carbon atoms, in the alkyl radical are particularly suitable. Effective amounts of antistats are generally in the range from 0.05 to 0.7% by weight.

The invention also provides a process for producing the film by the coextrusion process known per se.

For the purposes of this process, the coextrusion process usually compresses and plasticizes the polymer or the polymer mixture of the individual layers in an extruder, and any additives added may already be present in the polymer or in the polymer mixture. The melts are then coextruded together and simultaneously through a flat-film die (slot die) and the extruded film having more than one layer is drawn off on one or more take-off rolls, whereupon it cools and solidifies.

It has proved particularly useful to maintain the take-off roll or take-off rolls at a temperature of from 10 to 80° C., preferably from 20 to 50° C., using a heating and cooling circuit.

The resultant film is then stretched longitudinally and transversely to the extrusion direction, orienting the molecular chains. This biaxial stretching (orientation) may be carried out simultaneously, e.g., in the blown-film or flat-film process, or in succession. Preference is given to biaxial stretching in succession, in which stretching is carried out firstly longitudinally (in the machine direction) and then transversely (perpendicularly to the machine direction). It is useful to carry out the longitudinal stretching with the aid of two rolls running at different speeds corresponding to the desired stretching ratio, and to carry out the transverse stretching with the aid of an appropriate tenter frame.

In the longitudinal direction, stretching is preferably at from 4:1 to 11:1, in particular from 4:1 to 7:1 for the stretching method in succession, and in the transverse direction, it is preferably at from 4:1 to 11:1, in particular from 6:1 to 10:1 for the stretching method in succession. The temperatures at which the longitudinal and transverse stretching are carried out may vary, and depend on the particular composition of the outer-layer mixture. In general the longitudinal stretching is preferably carried out at from 100 to 140° C. and the transverse stretching preferably at from 155 to 170° C.

The biaxial stretching of the film is followed by its heat-setting (heat-treatment), where the film is held from about 0.5 to 10 s at a temperature of from 140 to 165° C. The film is then wound up in a usual manner using wind-up equipment.

After the biaxial stretching the film may, if desired and as mentioned above, be corona- or flame-treated on one or both of its surfaces by one of the known methods. The intensity of the treatment is preferably in the range from 38 to 42 mN/m.

A useful procedure for the corona treatment is to pass the film between two conductors serving as electrodes, where the potential, usually an alternating potential (from about 5 to 20 kV and from 5 to 30 kHz) applied between the electrodes is sufficiently high for corona discharges to occur. The corona discharge ionizes the air above the film surface, and there is a reaction with the molecules of the film surface producing polar inclusions in the essentially nonpolar polymer matrix.

For flame-treatment with a polarized flame (cf. U.S. Pat. No. 4,622,237 herein incorporated by reference) a direct voltage is applied between a burner (negative pole) and a chill roll. The voltage applied is generally from 500 to 3000 V, preferably in the range from 1500 to 2000 V. It increases the acceleration of the ionized atoms, which impact the polymer surface with greater kinetic energy. The chemical bonds within the polymer molecule are more easily broken open, and free-radical formation proceeds more rapidly. Thermal stress on the polymer here is much lower than for standard flame-treatment, and the sealing properties of the treated side in the films obtained can be even better than those of the non-treated side.

The invention will now be described in more detail using working examples. The examples are for illustration purposes only and do not limit the scope of the invention.

EXAMPLE 1

Using the coextrusion process, a three-layer film with layer structure D1/B/D2 and 1 mm overall thickness was extruded from a slot die at an extrusion temperature of 260° C.

The base layer consisted essentially of a propylene homopolymer with an n-heptane-soluble fraction of 4.5% by weight, a melting point of 165° C. and a melt flow index of 3.2 g/10 min at 230° C. and 2.16 kg load (DIN 53 735). The base layer additionally comprised 0.15% by weight of an N,N-bis(hydroxyethyl)-($C_{10}$–$C_{20}$)-alkylamine and 0.14% by weight of erucamide.

Outer layer D1 consisted essentially of a polyethylene with an MFI of 3.0 g/10 min (at 190° C. and 2.16 kg), a Vicat softening point of 101° C. (to ASTM-D1525) and a melting point by DSC of 122° C. (linear polyolefin from Dow Chemicals Europe). Outer layer D1 additionally comprised 0.2% by weight, based on the layer, of $SiO_2$ with an average particle size of 4 $\mu$m as antiblocking agent.

Outer layer D2 consisted essentially of a mixture of two components A and B in an A:B ratio of 66:34 (by weight). Outer layer D2 additionally comprised 0.3% by weight, based on the layer, of polymethyl methacrylate (PMMA) with an average particle size of 4 $\mu$m as antiblocking agent.

Component A was a propylene homopolymer with an n-heptane-soluble fraction of 4.5% by weight, a melting point of 165° C. and a melt flow index MFI of 6.0 g/10 min at 230° C. and 2.16 kg load (DIN 53 735).

Component B was a propylene-ethylene copolymer with an ethylene content of 3.5% by weight, based on the weight of the copolymer, a melting point, by DSC measurement, of 138° C. and a melt flow index of 6.0 g/10 min at 230° C. and 2.16 kg load (DIN 53 735).

Components A and B were mixed in an A:B ratio of 34:66 in a Henschel mixer for 2 min at 500 rpm to give a homogeneous pelletized mixture.

For stabilization, all of the layers comprised 0.12% by weight of pentaerythritol tetrakis[3-(3,5-di-tert-butyl-4-hydroxyphenyl)propionate] (®Irganox 1010), and also 0.06% by weight of calcium stearate as neutralizing agent.

Using appropriate steps in the process after coextrusion, the extruded three-layer film was drawn off and cooled, and then stretched longitudinally, stretched transversely, heat-set and corona-treated, using a first take-off roll and a further group of three rolls. The detailed conditions selected were the following:

| | |
|---|---|
| Extrusion: | extrusion temperature 260° C. temperature of the first take-off roll 30° C. temperature of the group of three rolls 30° C. |
| Longitudinal stretching: | stretching roll T = 115° C. longitudinal stretching by a factor of 5 |
| Transverse stretching: | heating zones T = 175° C. stretching zones T = 165° C. transverse stretching by a factor of 10 |
| Heat-setting: | temperature T = 155° C. |
| Corona-treatment: | potential: 10,000 V<br>frequency: 10,000 Hz |

The film produced in this way and having more than one layer had surface tension of from 40 to 41 mN/m immediately after its production. The thickness of the film was about 20 μm and that of each outer layer was about 0.8 μm.

COMPARATIVE EXAMPLE 1

A film was produced as described in Example 1, except that instead of the linear polyolefin for outer layer D1 a random ethylene-propylene copolymer was used which was the same as component B of outer layer 2 in Example 1. This propylene-ethylene copolymer therefore had an ethylene content of 3.5% by weight, based on the weight of the copolymer, a melting point, measured by DSC, of 138° C. and a melt flow index of 6.0 g/10 min at 230° C. and 2.16 kg load (DIN 53 735). As described in Example 1, outer layer D1 comprised 0.2% by weight of the same $SiO_2$ as antiblocking agent.

COMPARATIVE EXAMPLE 2

A film was produced as described in Example 1, except that instead of the linear polyolefin for outer layer D1 a random ethylene-propylene-butylene terpolymer was used which had an ethylene content of 4.0% by weight, a butylene content of 2% by weight and a propylene content of 94% by weight, based in each case on the weight of the terpolymer. The terpolymer had a melting point, measured by DSC, of 125° C. and a melt flow index of 6.0 g/10 min at 230° C. and 2.16 kg load (DSIN 53 735). As described in Example 1, outer layer D1 comprised 0.2% by weight of the same $SiO_2$ as antiblocking agent.

COMPARATIVE EXAMPLE 3

A film was produced as described in Example 1, except that instead of the linear polyolefin for outer layer D1 use was made of a low-density polyethylene (LDPE), as in the prior art. The LDPE had a density of 0.916 g/cm$^3$, a Vicat softening point of 85° C. and a melt flow index of 8.0 g/10 min at 190° C. and 2.16 kg load (DIN 53 735). As described in Example 1, outer layer D1 comprised 0.2% by weight of the same $SiO_2$ as antiblocking agent.

COMPARATIVE EXAMPLE 4

A film was produced as described in Example 1, except that instead of the linear polyolefin for outer layer D1 use was made of a linear low-density polyethylene (LLDPE), as in the prior art. The LLDPE had a density of 0.921 g/cm$^3$, a melting point, measured by DSC, of 119° C. and a melt flow index of 5.5 g/10 min at 190° C. and 2.16 kg load (DIN 53 735). As described in Example 1, outer layer D1 comprised 0.2% by weight of the same $SiO_2$ as antiblocking agent.

COMPARATIVE EXAMPLE 5

A film was produced as described in Example 1, except that instead of the polymer mixture made from propylene homopolymer and copolymer for outer layer D2 use was made solely of the propylene homopolymer with an n-heptane-soluble fraction of 4.5% by weight, a melting point of 165° C. and a melt flow index MFI of 6.0 g/10 min at 230° C. and 2.16 kg load (DIN 53 735). As described in Example 1, outer layer D2 comprised 0.2% by weight of the same $SiO_2$ as antiblocking agent.

COMPARATIVE EXAMPLE 6

A film was produced as described in Comparative Example 1. Unlike in Example 1, there was now no erucamide in the base layer.

EXAMPLE 2

A film was produced as described in Example 1, except that instead of PMMA in outer layer D2 the antiblocking agent used was an amount of 0.3% by weight of an Na—Al silicate with an average particle diameter of 4 μm.

The following test methods were used to characterize the raw materials and the films:

Melt Flow Index

Measurement of melt flow index was based on DIN 53 735 with 2.16 kg load and at 230° C. or, respectively, with 5.0 kg load and at 190° C.

Melting Point, Melting Range and Crystallization Interval

Measurement by DSC, maximum of the melting curve, heating and cooling rates 10 K/min (Perkin Elmer DSC 7).

Vicat Softening Point

The Vicat softening point was determined to DIN 63 460.

Density

Density was determined to DIN 53 479 using method A.

Coefficient of Friction

The static and sliding coefficients of friction were determined to DIN 53 375.

Surface Tension

The surface tension was determined using the method known as the ink method (DIN 53 364).

Printability

The corona-treated films were printed 14 days (short-term evaluation) and, respectively, 6 months (long-term evaluation) after their production. Ink adhesion was assessed by testing with adhesive tape. Ink adhesion was assessed as moderate if little ink was pulled away using adhesive tape and as poor if a significant amount was pulled away.

Bond Strength

Bond strength was determined on a tensile-testing machine or a friction-testing machine by the T-peel method.

For this, the ends of a laminate specimen 2.54 mm (1 inch) in width were separated and clamped into the test machine, and then pulled apart at a rate of 100 mm/min over a period of 24 s. Measurement of the peel force begins after a running-in time of 4 s, and the force is determined in g/inch as an average over the test period of 20 s. To facilitate separation of the ends of the film, one end of the laminate specimen is dipped (for up to 20 min) into an organic solvent, such as toluene.

The properties of the films are shown in the following table.

| EX. | COEFFICIENT OF SLIDING FRICTION SIDE D2 | COEFFICIENT OF STATIC FRICTION SIDE D2 | DIFFERENCE BETWEEN COEFFICIENTS OF FRICTION | BOND STRENGTH OF D1 WITH RESPECT TO POLYETHYLENE EXTRUSION LAYER (++ = VERY GOOD) |
|---|---|---|---|---|
| E1 | 0.25 | 0.30 | 0.05 | ++ |
| CE1 | 0.25 | 0.30 | 0.05 | -- |
| CE2 | 0.25 | 0.30 | 0.05 | -- |
| CE3 | 0.25 | 0.30 | 0.05 | -- |
| CE4 | 0.25 | 0.30 | 0.05 | - |
| CE5 | 0.25 | 0.50 | 0.25 | ++ |
| CE6 | 0.40 | 0.60 | 0.20 | ++ |
| E2 | 0.35 | 0.40 | 0.05 | ++ |

German Application 198 23 162.8 filed May 23, 1998 is incorporated herein by reference in its entirety.

Although only a few exemplary embodiments of this invention have been described in detail above, those skilled in the art will readily appreciate that many modifications are possible in the exemplary embodiments without materially departing from the teachings and advantages of this invention. Accordingly, all such modifications are intended to be included within the scope of this invention.

We claim:

1. A laminate comprising (a) a biaxially oriented polyolefin film comprising (i) a base layer comprising a propylene polymer and a fatty amide and (ii) an outer layer that comprises at least 80% by weight of a linear olefin polymer, and (b) an extrusion laminated polyethylene layer on the outer layer (ii).

2. A laminate as claimed in claim 1, wherein the linear olefin polymer comprises from 99.5 to 92% by weight of ethylene and from 0.5 to 8% by weight of octene units and the crystallization interval, determined by DSC at 20 K/min, is in the range from 90 to 120° C.

3. A laminate as claimed in claim 1, wherein the linear olefin polymer has a MFI at 5.0 kg/190° C. of from 0.2 to 20 g/10 min measured by DIN 53 735, and a melting point, measured by DSC, of from 100 to 150° C.

4. A laminate as claimed in claim 1, wherein the outer layer comprises from 0.05 to 1% by weight of an antiblocking agent with an average particle size of from 1 to 6 $\mu$m.

5. A laminate as claimed in claim 1, wherein the outer layer was exposed to a process for increasing surface tension.

6. A laminate as claimed in claim 1, wherein the base layer comprises from 0.01 to 0.5% by weight, based on the weight of the base layer, of the fatty amide.

7. A laminate as claimed in claim 1, wherein the base layer comprises a propylene polymer of at least 90% by weight of propylene, and has a melting point of at least 140° C., and a melt flow index in the range from 0.5 to 10 g/10 min.

8. A laminate as claimed in claim 1, wherein the film has, on the opposite side of the outer layer, a second outer layer which comprises at least 80% by weight of a mixture of components A and B, where component A is a propylene homopolymer and component B is a propylene copolymer, propylene terpolymer, or mixture of the copolymer and terpolymer.

9. A laminate as claimed in claim 8, wherein component A has a melting point of from 150 to 170° C. and a MFI of from 5 to 8 g/10 min and is present in an amount of from 50 to 90% by weight, and component B has a melting point of from 115 to 135° c. and a MFI of from 3 to 15 g/10 min and is present in amounts of from 50 to 10% by weight, where % by weight is based on the weight of the second outer layer.

10. A laminate as claimed in claim 8, wherein the second layer comprises from 0.01 to 0.5% by weight, based on the weight of the second outer layer, of an antiblocking agent.

11. A laminate as in claim 8, wherein the difference between the coefficients of sliding and static friction of the second outer layer is not more than 0.2 units.

12. A laminate as claimed in claim 1, which comprises polymethyl methacrylate particles in an outer layer an as antiblocking agent.

13. A laminate claimed in claim 1, wherein the fatty amide comprises erucamide.

14. A process for producing a laminate as claimed in claim 1, comprising (a) forming said biaxially oriented polyolefin film layer, and (b) applying by extrusion lamination to said outer layer (ii) said polyethylene layer.

15. A process as claimed in claim 14, wherein said (a) comprises extruding the melts corresponding to the individual layers of the film through a flat-film die, drawing the coextruded film over a take-off roll whose temperature is from 40 to 100° C., biaxially stretching the film with a longitudinal stretching ratio of from 4:1 to 7:1 and with a transverse stretching ratio of from 8:1 to 10:1, heat-setting the biaxially stretched film, and optionally corona-treating the film, and then winding up the film.

* * * * *